July 6, 1948. F. B. YINGLING Re. 23,015
REVERSIBLE ROTARY BLOWER
Original Filed Sept. 19, 1941 3 Sheets-Sheet 1
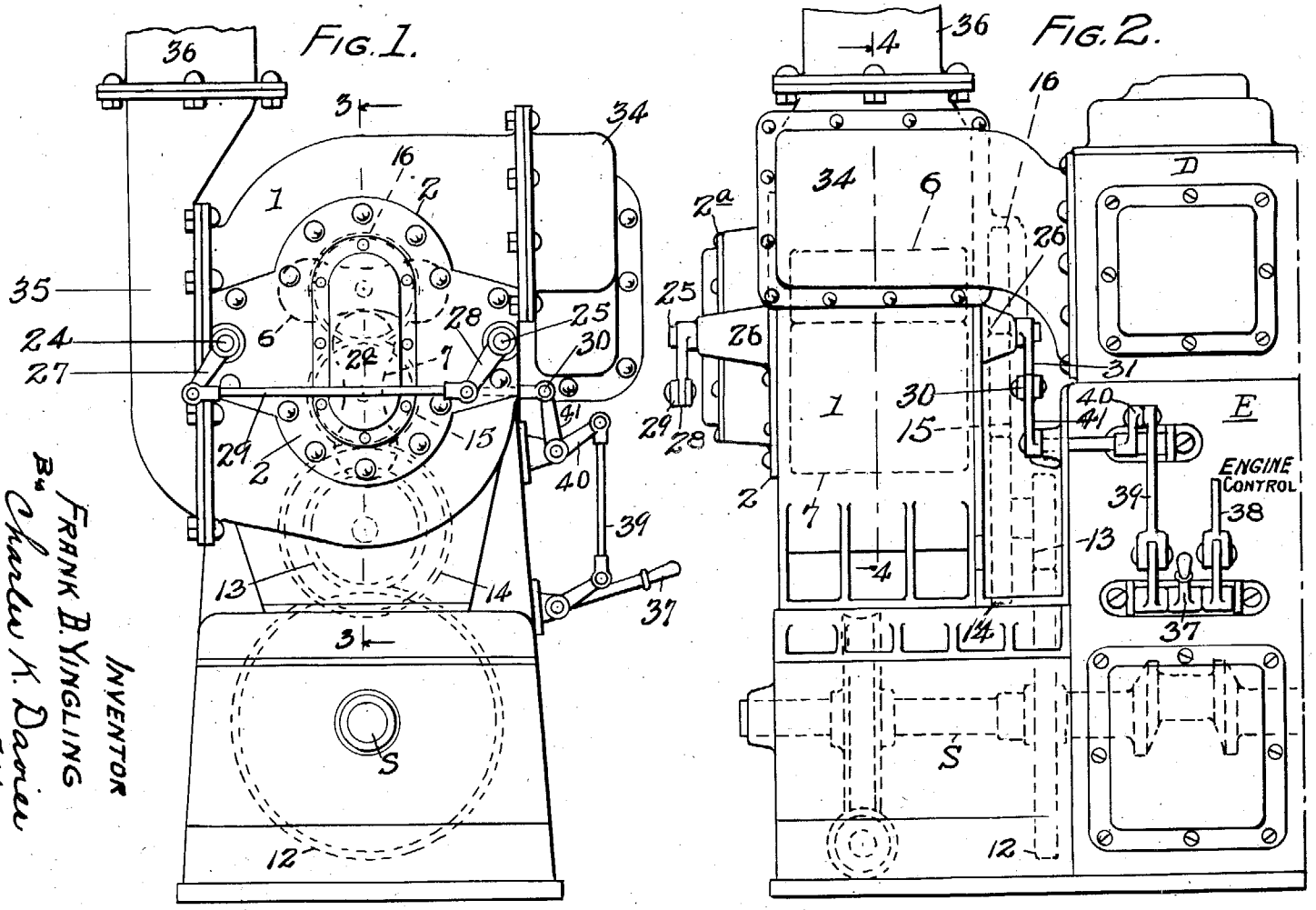

REVERSIBLE ROTARY BLOWER

Original Filed Sept. 19, 1941 3 Sheets-Sheet 2

INVENTOR.
FRANK B. YINGLING
BY
Charles K. Davies
Atty.

July 6, 1948. F. B. YINGLING Re. 23,015

REVERSIBLE ROTARY BLOWER

Original Filed Sept. 19, 1941 3 Sheets-Sheet 3

INVENTOR.
FRANK B. YINGLING
BY
Charles K. Davies

Reissued July 6, 1948 Re. 23,015

UNITED STATES PATENT OFFICE 23,015

REVERSIBLE ROTARY BLOWER

Frank B. Yingling, Hamilton, Ohio

Original No. 2,355,494, dated August 8, 1944, Serial No. 411,560, September 19, 1941. Application for reissue February 10, 1945, Serial No. 577,253

5 Claims. (Cl. 230—137)

My present invention relates to an improved reversible rotary blower capable of delivering a desired volume of fluid pressure when rotating in either forward or reverse direction, and control means are provided for changing the entry direction to, through, and out of the blower casing, in accord with changes in the rotational movement of the blower. While my improved blower is adapted for impelling various fluid currents, it is particularly designed for impelling air, preferably at comparatively low pressure for scavenging use with internal combustion engines of the Diesel type. When such engines are adapted for ship propulsion the blower of my invention is especially applicable for combination with the engine, and the reversible blower is controlled by the reversing devices of the engine.

In carrying out my invention I have provided a compactly arranged blower that occupies comparatively small space, which is fashioned of a minimum number of parts to facilitate manufacture, installation, and operation of the apparatus, and which, because of its simplicity in construction, is easily operated when necessary, and durable.

The invention consists in certain novel combinations and arrangements in the blower including an exterior housing and interior impeller casing, with a single valve at each side of the casing to control an intake port and an outlet port, and means for changing the positions of the valves to vary the entry and delivery direction of air currents through the casing.

In the accompanying drawings I have illustrated one complete example of the physical embodiment of my positive displacement blower, which is installed for use with a Diesel engine of the marine type.

Figure 1 is an end view of the engine showing the blower mounted thereon, and the control mechanism for the engine and the valve mechanism of the blower.

Figure 2 is a side elevation of the blower showing also in side elevation a portion of the end of the engine on which the blower is mounted.

In order that utility of the blower may readily be appreciated, I have indicated in Figures 1 and 2 a portion of the engine as E, with its main shaft or crankshaft S from which the blower is operated, and in Figure 2 is seen a portion of the air duct D that supplies low pressure air currents to the cylinders of the engine for scavenging purposes, as well as air for combustion in the fuel mixture.

The reversible positive displacement blower is shown as located or mounted on the end of the engine and extending transversely thereof, with the shafts of the rotary interengaging impellers and the hinges or pivots of the two control valves parallel with the main shaft S of the engine.

The compactly arranged apparatus includes an exterior housing 1 having openings in its opposite side walls, and these side openings are closed by exterior bearing plates 2 and 3 which also form frame portions that are bolted to the opposite sides of the housing.

Within the housing and between these side plates is provided an interior impeller casing that includes two transversely extending, upper and lower, spaced concaves 4 and 5, here shown as approximately semi-circular in cross-section, and in which the two interengaging impellers or rotors 6 and 7 revolve in well known manner to create the air currents.

These impellers or rotors are synchronized to rotate in opposite directions so that their wings will sweep the air through the respective concaves to create the desired air blast which passes through the interior casing, and one wing of one impeller cooperates with the pivotal portion of the other impeller to create a central air seal between the two spaced wall openings of the casing.

Figure 4:
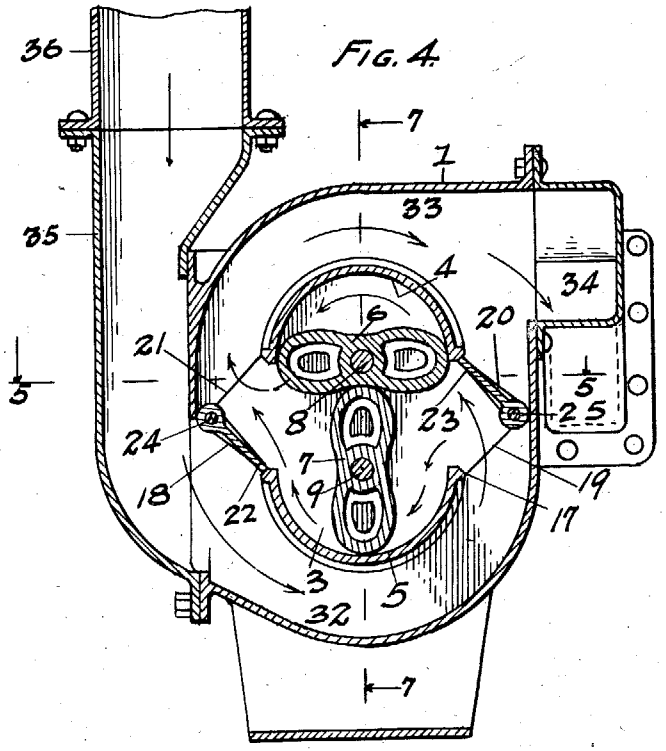
Figure 4 is a vertical sectional view transversely of the engine as at line 4—4 of Figure 2.

In Fig. 4 the rotor 6 is rotating counter-clockwise and the rotor 7 is turning clockwise for creating the passage of a current of air from the right end opening through the interior casing to the left end thereof as indicated by arrows. It will be understood that when the engine is reversed the blower also is reversed, and the rotors of the impeller in Fig. 6 rotate as indicated by the arrows, i. e. rotor 6 turns clockwise and rotor 7 turns counter-clockwise to create the air current from the left end of the casing, therethrough, and out at the right end of the casing. The two rotors of the impeller, which are shown as having hollow wings, are mounted on their respective shafts 8 and 9 and these shafts at their ends project through the sides of the casing, and also through bearing bosses 10 of the side plate 2 and bearing bosses 11 of the side plate 3. These bosses are located on the outer sides of the side plates, and the ends of the shafts are journaled in the bosses and provided with usual fastening means as nuts as indicated.

Figure 3:
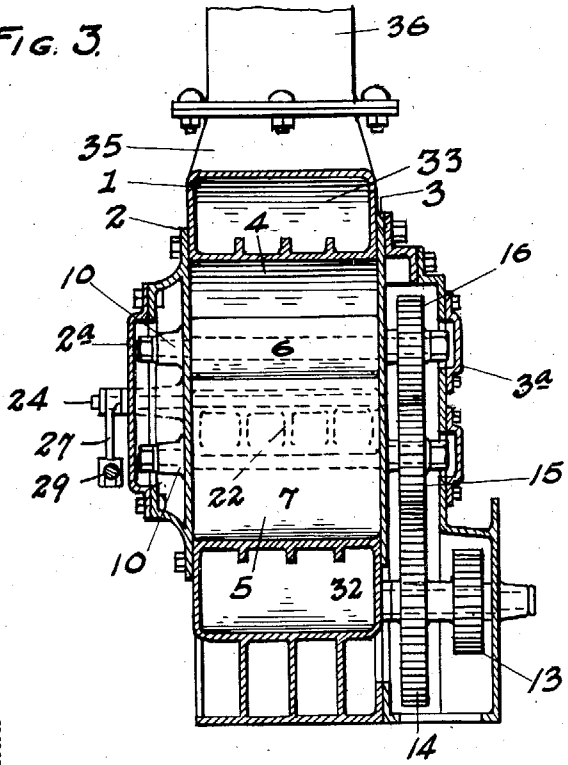
Figure 3 is a vertical sectional view as at line 3—3 of Figure 1.
Figure 7:
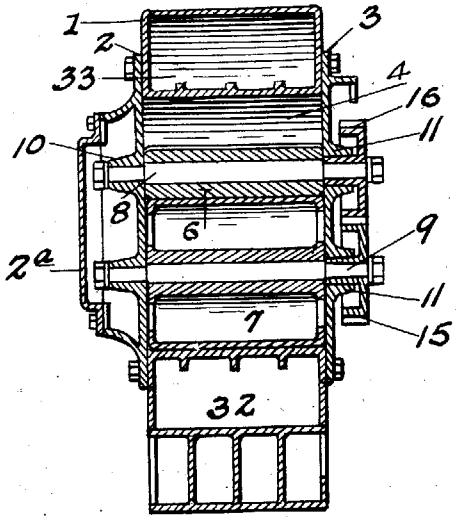
Figure 7 is a vertical sectional view showing especially the details of the two impellers and their driving gears or pinions.

The interengaging rotors of the impeller are synchronized for operation with the engine shaft S, and power is transmitted from the main shaft to the blower apparatus through an intermediate train of gears and pinions indicated as 12, 13, 14, 15 and 16, the large gear 12 being mounted on the engine shaft S, and the last small gears or pinions 15 and 16 being mounted on the ends of the blower shafts as best seen in Figures 3 and 7.

The opposite sides of the interior casing including the ends of the concaves 4 and 5 are closed by the plates 2 and 2a and 3 and 3a, and the removal of these plates, of course, permits ready access to the interior of the casing for servicing the rotors of the impeller and other parts of the blower.

Figure 6:
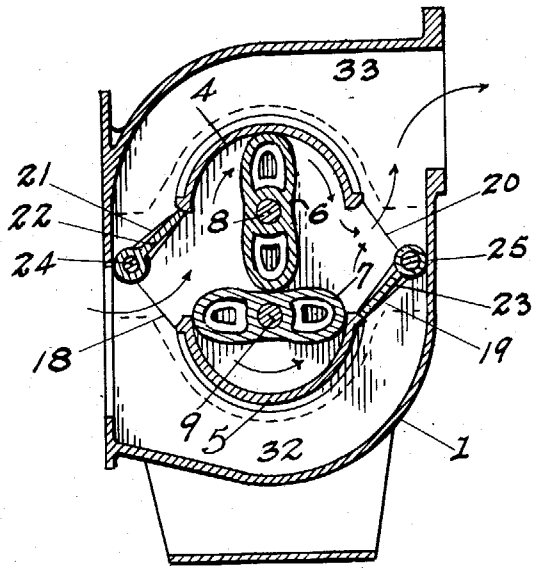
Figure 6 is a sectional view showing the body of the blower, but with the interengaging impellers in section and rotating in direction opposite to that of Figure 4, the two valves in positions opposite to the valves in Figure 4, and the air currents entering, passing through, and being delivered from the casing in direction opposite to that of Figure 4.

As best seen in Figures 4 and 6 the several parallel edges of the spaced semi-circular or semi-cylindrical concaves 4 and 5 may be fashioned with out-turned lips or flanges that provide seats 17 along one edge of each of the four ports 18, 19, 20, and 21 that are angularly disposed in pairs between the concaves, and the ports extend from one open side of the impeller casing to the opposite open side.

Each port 18 and 19 at opposite ends of the impeller casing merges with an adjoining wall-opening in the casing, and these ports are alternately used as air intake ports opening into the interior of the casing. Each port 20, 21, at opposite ends of the impeller casing also merges with an adjoining wall-opening in the casing, and these ports 20, 21, which are disposed angularly of ports 18 and 19, are alternately used as outlet ports for air currents from the interior of the impeller casing.

In Figure 4 the lower right hand intake port 19 is shown as open, and the upper left hand outlet or delivery port 21 is open, while the lower left hand intake port 18 is closed by a pivoted or hinged flap valve 22, and the upper, right hand outlet or delivery port 20 is closed by an oppositely arranged pivoted or hinge valve 23. Thus it will be apparent that one valve closes an intake port while the other valve closes an outlet port at the opposite sides of the impeller, leaving an intake port open at one side of the impeller and an outlet or delivery port open at the opposite side of the impeller. These valves are connected so that they move simultaneously to change the flow of air currents through the blower casing when the rotary movements of the rotors are reversed in accord with the reversal of movement of the engine shaft S.

In Figure 4 the valves are arranged so that the air current is passing through the casing from right to left, while in Fig. 6 the positions of the valves have been changed and the air current is passing through the impeller casing from left to right.

As indicated in the drawings the adjoining ports at each side of the impeller are arranged at approximately 90-degree angles, and each valve is movable through an arc of approximately ninety-degrees to open one valve port and close the angularly adjoining port, thereby providing a compactly arranged valve mechanism for directly controlling the movement of air currents to, through, and out of the impeller casing.

Figure 5:
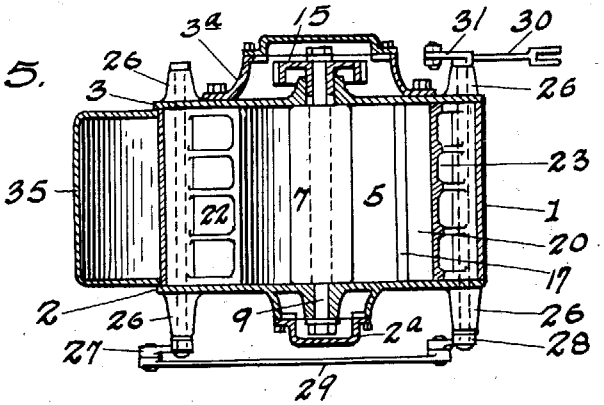
Figure 5 is a horizontal sectional view as at line 5—5 of Figure 4.

The valves are each provided with a hinge pin or journal pin as 24 and 25 respectively, which pins pass through the openings at the sides of the impeller casing, and as seen in Figures 1, 2, and 5 the ends of the pins are journaled in bearing bosses as 26 mounted upon the exterior sides of the plates 2 and 3 of the housing.

These hinge pins of the valves are connected with each other at the front of the blower by means of lever arms 27 and 28 and the connecting link 29 and the arms and pins with their valves are moved simultaneously by a pull or push on a short operating link 30 that is pivoted to the lower free end of a lever arm 31 mounted on the valve pin 25 at the rear of the blower.

As best seen in Figures 4 and 6 the two intake ports 18 and 19 open outwardly to a constant intake chamber 32, and the outlet or delivery ports 20 and 21 open outwardly from the interior of the impeller casing to an outlet chamber or constant delivery chamber 33 for air under pressure. These respective chambers are shown in Figure 6 as inclosed within the exterior housing and formed between the outer walls of the housing and the concaves of the interior impeller casing, which concaves are surrounded by the respective chambers. The intake ports 18 and 19 afford direct communication between the constant intake chamber and the interior of the impeller casing, and the outlet ports 20 and 21 afford direct communication between the interior of the impeller casing and the outlet or constant delivery chamber, and the valves 22 and 23 have direct control of these ports to change the direction of flow of air currents. The delivery chamber or pressure chamber 33 delivers air under pressure to the interior passage of an angular connection 34 that unites the blower with the air duct D of the engine, and the intake chamber 32 receives air through the passage in the feed nozzle 35 and pipe 36.

It will be apparent that the air currents at all times move in the same direction through the passage of the connection 34 toward the air duct D of the engine, but the entry-direction of air to the impeller casing may be changed from one side of the impellers to the opposite side thereof thereby reversing the flow of air currents through the casing and changing the outlet or delivery direction of air currents from one side to the other side of the impellers.

These changes in the directional flow of air currents through the interior of the impeller casing may be under manual control, but when the blower apparatus is combined with the engine as illustrated the control of the valves is co-ordinated with the engine control so that the valves are reversed from the engine control station by the engineer when the engine is reversed. Thus the operation of the rotors and the control of the two valves are automatically controlled by and synchronized with the control of the engine.

The engine control for forward and reverse movement of the shaft S is indicated in Figures 1 and 2 by a conventionalized hand lever 37 and the connecting link 38, and suitable linkage is provided to the link 30 (heretofore mentioned) as indicated at 39, 40, and 41, for simultaneously changing the position of the two valves.

Having thus fully described my invention, what I claim as new and desire to secure by Letters Patent is:

1. In a reversible rotary blower, the combination with an exterior housing and a spaced interior casing forming a constant intake chamber and a constant delivery chamber, said casing comprising two spaced hemispherical concaves having each an intake port and an outlet port at each side of the blower, said ports being located between the interior of the casing and said chambers, and a pair of reversible rotary interengaging impellers within the casing and operating means therefor, of a valve at one side of the casing controlling an intake port and an outlet port, another valve at the other side of the casing controlling an outlet port and an intake port, and means for reversing the positions of said valves to reverse the passage of air currents through the casing.

2. In a reversible rotary blower including an impeller casing, the combination of interengaging rotary impellers mounted in the casing, and reversible means for driving the impellers, said casing having a pair of controlled and opposed intake ports and another pair of controlled and opposed outlet ports, and means co-acting with opposed wall-openings in the casing and operative to alternately open and close the ports in the respective pairs of ports to reverse the entry and delivery directions of air currents through the casing.

3. In a reversible rotary blower, the combination with an exterior housing having spaced constant intake and delivery chambers, of a casing located between said chambers, said casing having a pair of opposed and controlled intake ports adapted to be alternately opened and closed and a pair of opposed and controlled outlet ports adapted to be alternately opened and closed, rotary interengaging impellers mounted in the casing between pairs of ports, reversible means for driving the impellers, and two spaced movable devices coacting with openings in opposite endwalls of the casing operable to open and close the respective pairs of intake and outlet ports with relation to the respective intake and delivery chambers.

4. In a reversible rotary blower, the combination with an exterior housing having spaced constant intake and delivery chambers, of a casing located between said chambers, said casing having a pair of opposed and controlled intake ports adapted to be alternately opened and closed and a pair of opposed and controlled outlet ports adapted to be alternately opened and closed, rotary interengaging impellers mounted in the casing between pairs of ports, reversible means for driving the impellers, two spaced movable devices co-acting with openings in opposite endwalls of the casing operable to open and close the respective pairs of intake and outlet ports with relation to the intake and delivery chambers, reversing means to control the driving means, and operative connections between said reversing means and said movable devices, whereby the entry and delivery directions of air currents are reversed through the casing.

5. In a reversible blower, the combination of an exterior housing and interior casing forming separate intake and delivery chambers within the housing, interengaging rotary impellers mounted in the casing and operating means therefor, said casing having wall-openings at opposite sides of the impellers communicating with one or another of the chambers, a pair of opposed flap valves pivotally mounted between said chambers at opposite sides of the impellers with their free edges co-acting alternately with spaced edges of the wall openings, means for reversing the rotation of the impellers and cooperating means for reversing the positions of the valves.

FRANK B. YINGLING.

REFERENCES CITED

The following references are of record in the file of this patent:

UNITED STATES PATENTS

| Number | Name | Date |
|---|---|---|
| 713,443 | Jewell | Nov. 11, 1902 |
| 1,904,056 | Kjaer | Apr. 18, 1933 |
| 2,037,407 | Taylor | Apr. 14, 1936 |

FOREIGN PATENTS

| Number | Country | Date |
|---|---|---|
| 265,511 | Great Britain | 1927 |
| 340,777 | Great Britain | 1931 |
| 550,082 | Great Britain | 1942 |
| 706,058 | France | 1931 |